May 26, 1970  B. J. MILLEVILLE  3,514,130
WELD END FITTINGS

Filed Sept. 19, 1966  4 Sheets-Sheet 1

INVENTOR
BERTRAM J. MILLEVILLE

BY
Strauch Nolan Neale Nies & Bronaugh
ATTORNEYS

May 26, 1970  B. J. MILLEVILLE  3,514,130
WELD END FITTINGS

Filed Sept. 19, 1966  4 Sheets-Sheet 2

INVENTOR
BERTRAM J. MILLEVILLE

Strauch Nolan Neale Nuss & Bronaugh
ATTORNEYS

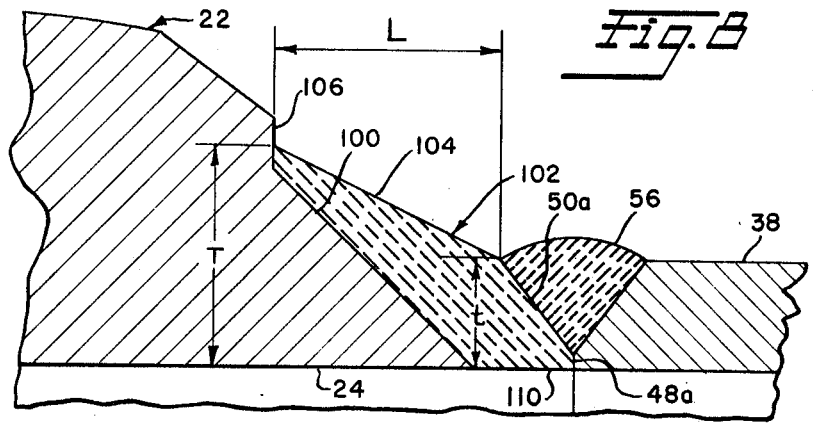
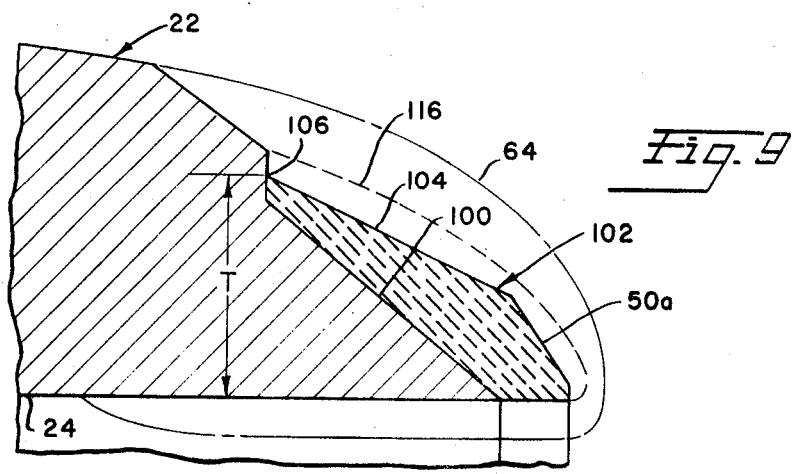
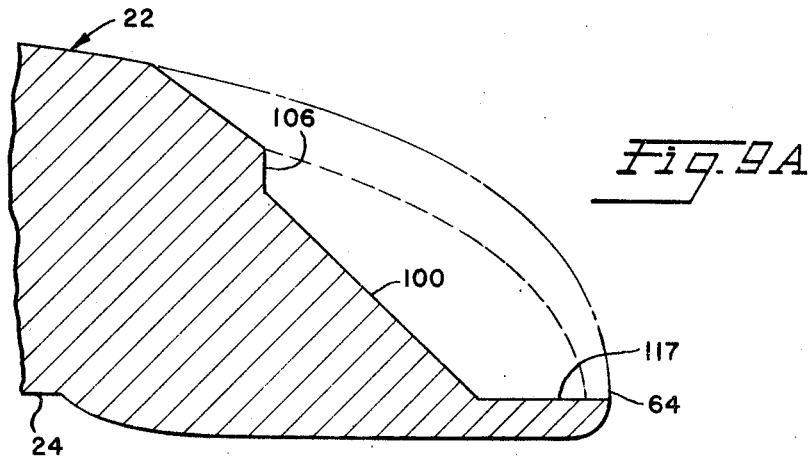
INVENTOR
BERTRAM J. MILLEVILLE

May 26, 1970 — B. J. MILLEVILLE — 3,514,130
WELD END FITTINGS
Filed Sept. 19, 1966 — 4 Sheets-Sheet 4
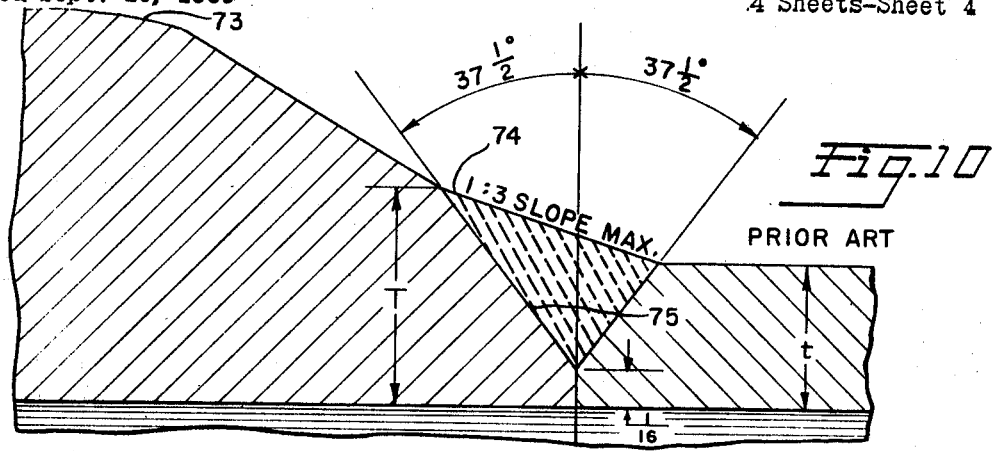
Fig.10 — PRIOR ART
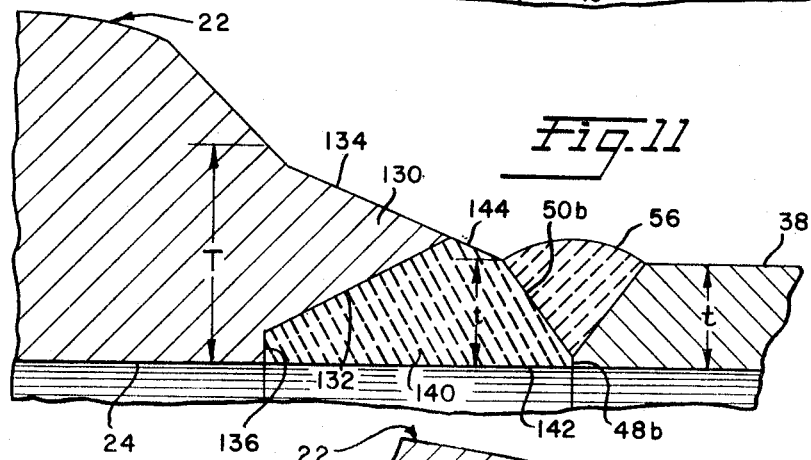
Fig.11
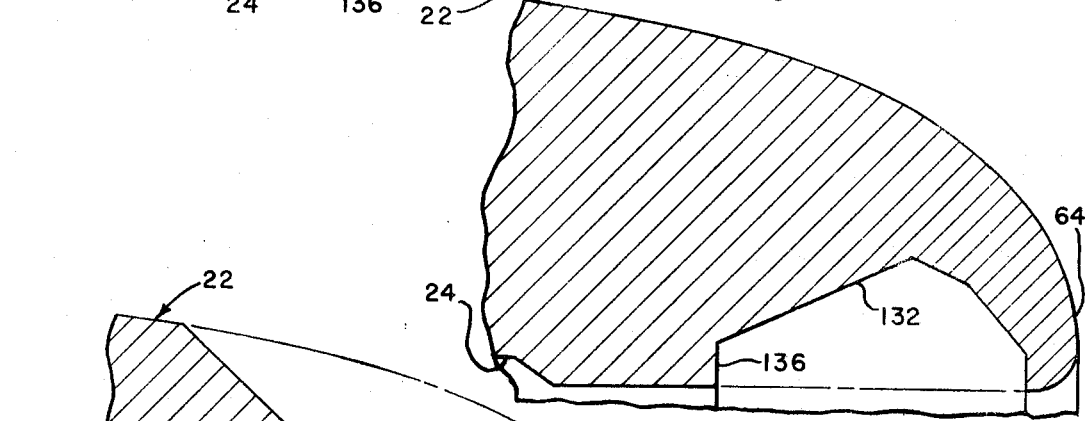
Fig.12
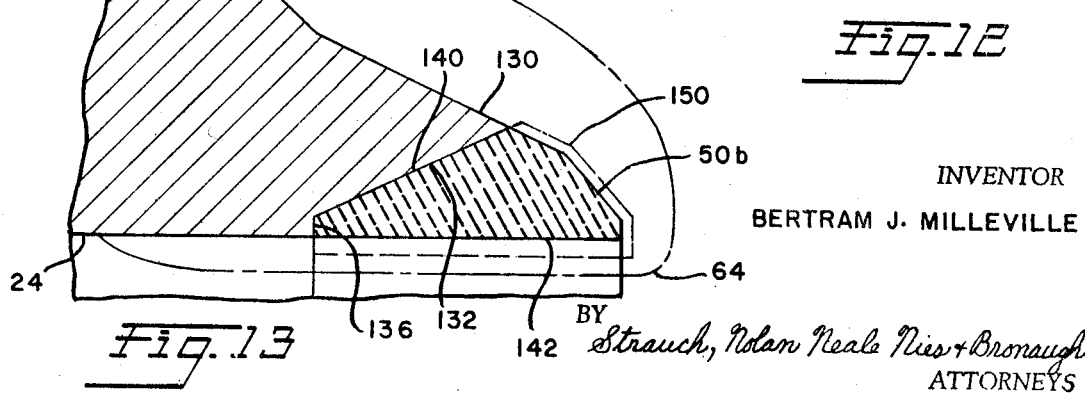
Fig.13
INVENTOR
BERTRAM J. MILLEVILLE
BY Strauch, Nolan Neale Nies & Bronaugh
ATTORNEYS

United States Patent Office 3,514,130
Patented May 26, 1970

3,514,130
WELD END FITTINGS
Bertram J. Milleville, Pittsburgh, Pa., assignor to Rockwell Manufacturing Company, Pittsburgh, Pa., a corporation of Pennsylvania
Filed Sept. 19, 1966, Ser. No. 580,493
Int. Cl. F16b *13/02, 47/02, 55/00*
U.S. Cl. 285—173                                    21 Claims

ABSTRACT OF THE DISCLOSURE

A fitting and method of making same wherein fluid inlet and/or outlet ends of the fitting, which are prepared for butt welding to a conduit or the like, are formed from weld metal and are fused to the cast or forged main body section of the fitting.

---

This invention relates to butt welding, fluid flow conduit fittings and to methods of their construction. The term "fitting" as defied herein is intended to cover valve bodies as well as elbows, T's, crosses, pipe flanges, blinds, and other fluid pressure containing parts which are adapted to be connected to a pipeline or the like.

When butt welding a fitting to a straight section of pipe, it is important that the weld joint be at least equal in strength to the straight pipe section. As a result, the product of section thickness at the "fitting end" and the yield strength at the fitting end of the weld is required to be at least equal to the product of the pipe wall thickness and the yield strength of the pipe. To meet this requirement for butt welding the usual cast or forged fitting to the present-day alloy pipe of considerably higher strength, the section thickness at the fitting end of the weld must be greater than the pipe wall thickness.

The butt welding of fittings to adjoining pipes having smaller wall thickness normally must conform to dimensional standards which often result in objectionable complications. The American Standard Code for Pressure Piping, for example, provides that the weld transition between ends of unequal thicknesses should have a slope which is not greater than 1:3 or approximately 18 degrees. This imposes a definite limitation on the ratio of fitting thickness to pipe wall thickness which can be joined with standard weld bevels. In addition, making a weld with a sloping surface is considerably more difficult than making a flat weld.

Where the thickness ratio is such that the slope of a transition butt weld would exceed the 1:3 ratio specified by the American Standard Code for Pressure Piping, it has been necessary, prior to this invention, to use an intermediate piece, which is commonly referred to as a "pup." This is a costly expedient, since the "pup" requires special fabrication and machining. Also, pups require an additional weld to be made, thus further contributing to increased costs in constructing a pipeline system.

The present invention overcomes the problems involved in welding ends of dissimilar thicknesses by providing a novel fitting with one or more weld metal ends which are fused to the cast or forged fitting body and which are prepared for butt welding to a pipeline. The weld metal ends are comparable in strength to the alloy steel pipe and thus may be tapered to a thickness equal to the thickness of the adjoining pipe with no strength-matching problem. The weld metal ends mentioned above are built up to define the inlet and outlet openings of the fitting.

One novel method of making a weld end fitting according to this invention is, in brief, to first conventionally form the fitting by a suitable casting or forging operation. If the fitting is cast or forged with standard dimensions, the pipe connection end or ends, depending upon the type of fitting, are cut back to a region where the ratio of thickness of the casting or forging to the thickness of the connecting pipe is at least equal to the ratio of the minimum yield strength for the pipe to the minimum yield strength for the cast or forged fitting. The material that is cut off is then replaced with high strength alloy weld metal which is fused to the casting or forging to provide a built-up continuation thereof. The weld metal end is then finally prepared for butting welding to the pipeline.

It is, therefore, a major object of this invention to provide a novel fluid flow fitting and method of construction which eliminates the problems encountered with butt welding ends of unequal thickness.

A more specific object of this invention is to provide a novel fluid flow, cast or forged fitting which has one or more built-up, weld metal ends that are adapted for butt welding to an adjoining pipe or the like.

Still another object of this invention is to provide a novel fluid flow fitting and method of construction wherein body and end sections of dissimilar materials are fused together to define a fluid flow passage between the inlet and outlet openings of the fitting.

Further objects of this invention will appear as the description proceeds in connection with the appended claims and the annexed drawings wherein:

Figure 7:
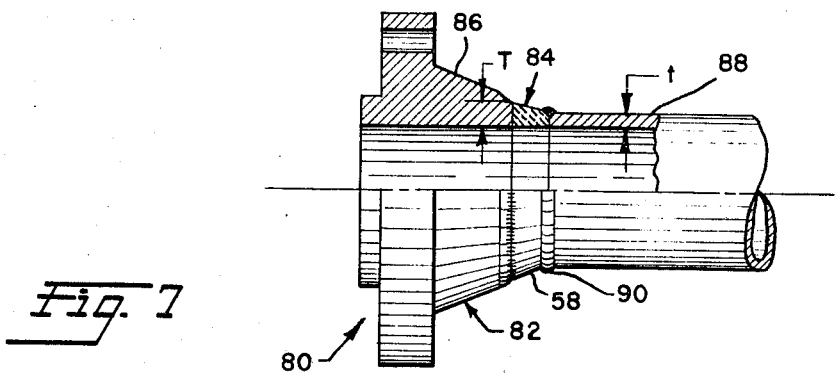
Figure 2:
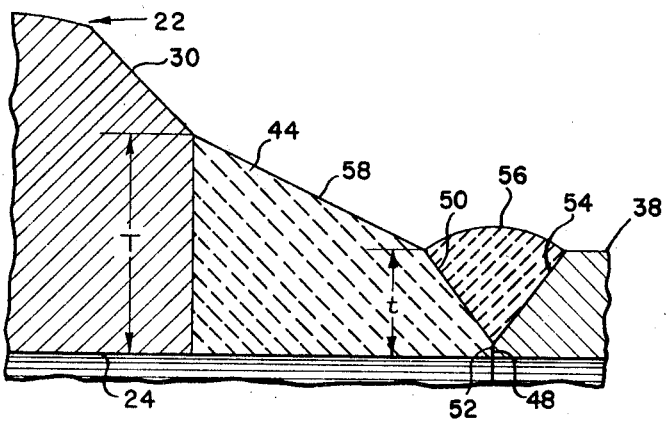
FIG. 2 is a fragmentary, enlarged section of the right-hand end of the valve body shown in FIG. 1.
Figure 4:
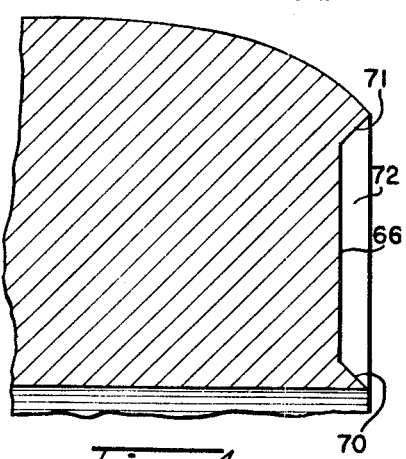
Figure 3:
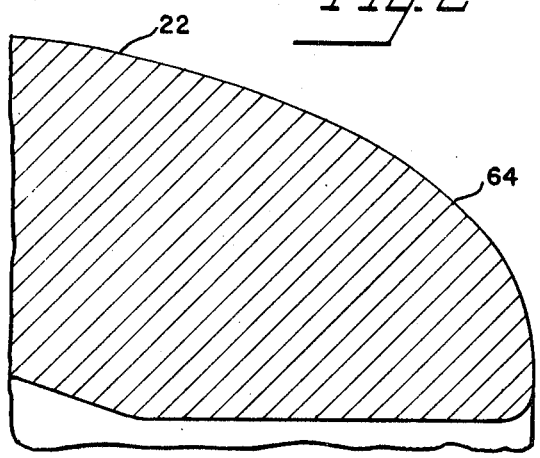
Figure 5:
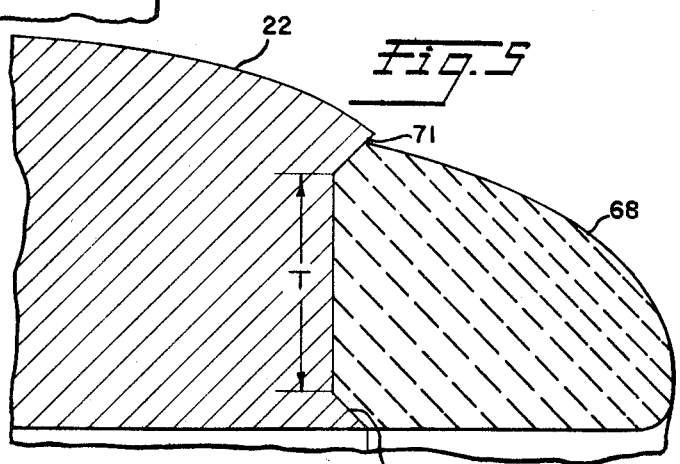
Figure 6:
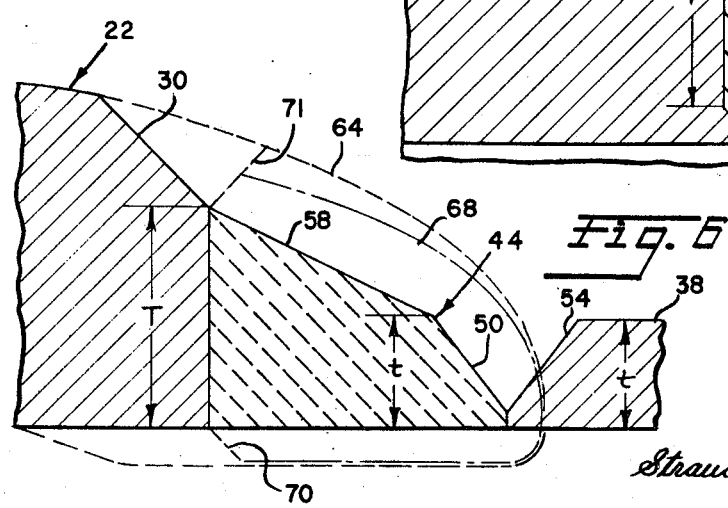

FIGS. 3, 4 and 5 which illustrate the enlarged right-hand end of the valve body in section, show the sequence of steps for forming the valve body according to one method of this invention;

FIG. 6 is an enlarged, fragmentary composite view of FIGS. 2–5;

FIG. 7 is a partially sectioned side elevation of a flange constructed in accordance with the principles of this invention;

FIG. 8 is an enlarged fragmentary section similar to FIG. 2, but showing a modified form of weld end fitting;

FIG. 9 is an enlarged fragmentary composite section showing the sequence of steps for forming the weld end fitting of FIG. 8;

FIG. 9a is an enlarged fragmentary section showing the prepared end of the rough casting or forging preliminary to the application of weld metal for forming the weld metal end section illustrated in FIG. 8;

FIG. 10 is a fragmentary, enlarged section which is similar to FIG. 2, but which shows a conventional fitting butt welded to the thinner pipe in accordance with the American Standard Code For Pressure Piping;

FIG. 11 is an enlarged, fragmentary section similar to FIG. 2, but showing still another embodiment of this invention;

FIG. 12 is an enlarged fragmentary section showing the prepared end of the rough casting or forging preliminary to the application of weld metal for forming the weld metal end section illustrated in FIG. 11; and FIG. 13 is an enlarged, fragmentary composite section showing the sequence of steps for forming the weld end fitting of FIG. 11.

Figure 1:
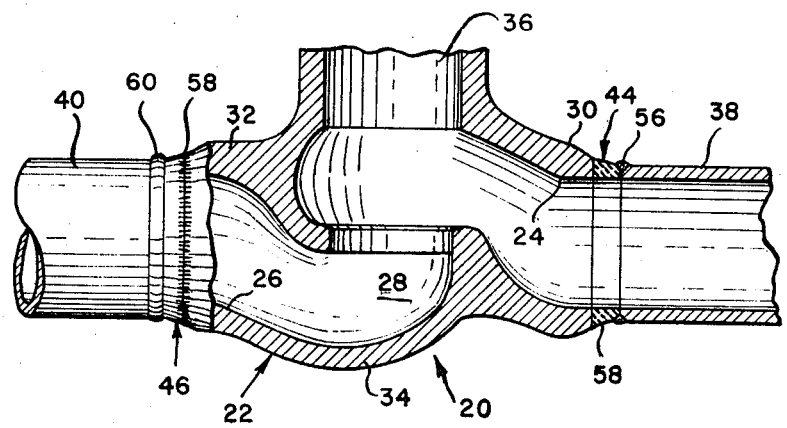
FIG. 1 is a partially sectioned side elevation of a valve body constructed according to the principles of this invention.

Referring now to the drawings and more particularly to FIG. 1, a valve body 20, constructed according to this invention, is shown to comprise a cast or forged central section 22 having the usual axially spaced apart, similar, cylindrical fluid flow passages 24 and 26 which open at their inner ends into an enlarged cavity or chamber 28. Body 20, in this embodiment, is for a two-way valve having an unshown valve member such as, for example, a plug which is received in cavity 28 and which is displaceable by manipulation of an unshown operating stem between positions where it may alternatively either block or provide fluid communication between passages 24 and 26. This invention, it will be appreciated, is not concerned with the construction of the valve closure member and stem assembly which may be of any suitable form such as that used, for example, in ball valves, plug valves, gate valves, check valves, and the like.

Still referring to FIG. 1, section 22 is formed with the usual axially spaced apart tubular portions 30 and 32 which, in this embodiment, are integrally joined at their inner ends by an enlarged intermediate body portion 34. Tubular portions 30 and 32 respectively define passages 24 and 26, and portion 34 defines cavity 28. The unshown valve operating stem is adapted to extend through a suitable opening 36 which is medially formed in portion 34.

Preferably, the diameters of passages 24 and 26 are equal to the internal diameter of the pipe for which the valve body is sized. Section 22 may be formed by conventional forging or casting.

Since the minimum yield of the cast or forged valve body is normally less than that of high strength pipe, the thickness of section 22 especially in the region of tubular portions 30 and 32 is required to be considerably greater than the pipe thickness to conform to applicable standards. The minimum cast or forged fitting thickness indicated by the dimension T in FIG. 2 may be determined by the following expression:

$$T_{min} = t \frac{S_p}{S_f}$$

where $t$ is equal to the thickness of the adjoining pipe, $S_p$ is equal to the minimum yield strength of the pipe, and $S_f$ is equal to the minimum yield strength of the cast or forged fitting section 22.

Usually, the outer ends of tubular portions 30 and 32 are tapered as shown in FIG. 2 so that the smallest thickness is at the end of each portion conforming to the requirement that T is at least equal to the value obtained from the above equation. Under these conditions, the strength of body section 22 will be at least equal to the strength of adjoining pipes 38 and 40 which may be made from alloy steel or the like and have a smaller wall thickness as indicated at $t$.

To overcome the previously discussed problems in butt welding ends of dissimilar thickness, built-up, weld metal end sections 44 and 46 (see FIG. 1) are respectively fused to the oppositely facing ends of tubular portions 30 and 32. End sections 44 and 46 are tubular and have substantially uniform internal diameters equal to that of tubular portions 30 and 32 to thereby define uniformly diametered continuations of passages 24 and 26 respectively.

As best shown in FIG. 2, the end face of section 44 is prepared for butt welding to the adjacent end of pipe 38. This butt welding preparation may be standard and is shown to comprise a planar annular shoulder surface 48 which axially faces the end of pipe 38 and which extends radially from the cylindrically smooth internal wall surface of section 44. Shoulder surface 48 is contained in a plane that normally intersects the longitudinal axis of pipe 38 and has a short radial length of about 1/16 of an inch. As shown, shoulder surface 48 is joined to a surface 50 which is contained in a conical envelope. In the plane of FIG. 2, the line defining surface 50 extends at an acute angle with the radial plane containing shoulder surface 48. This acute angle preferably is about 37 degrees. Surface 50 extends rearwardly from surface 48 to a region where the thickness of section 44 is equal to the thickness $t$ of pipe 38.

The adjacent end of pipe 38 is similarly prepared for butt welding and has opposing radial and conical surfaces 52 and 54 which are in mirror image relation to surfaces 48 and 50 respectively. Surfaces 48, 50, 52, and 54 are contoured and dimensioned to preferably meet ASA standards and provide for an annular, V-shaped butt weld groove in a manner well known in the art.

A V-type butt weld 56 is provided between the prepared ends of section 44 and pipe 38 in any suitable, conventional manner. For example, weld 56, which is formed in a ring, is obtained by an arc welding or other fusion process wherein the opposed ends of section 44 and pipe 38 are heated to a molten state in the presence of filler metal obtained by melting a welding rod or wire in the arc to form weld 56. Weld filler rod or wire must be so constituted as to deposit weld metal having a strength at least equal to the strength of the joined materials.

Since the weld deposit is equal in strength to the metal of the pipe, the minimum thickness of section 44 in the region where weld 56 terminates may be made to be equal to the thickness of pipe 38. The necessity of providing weld 56 with a slope or using a pup, as is the case when ends of dissimilar thicknesses are butt welded, is therefore eliminated. With the fitting of this invention, the weld may conveniently and easily be made since the thicknesses at the ends of section 44 and pipe 38 where surfaces 50 and 54 terminate are made equal, and the surface of the weld is flat as in pipe-to-pipe welds.

Still referring to FIG. 2, the thickness of section 44 at the region where it fuses to the axially facing end surface of tubular portion 30 is equal to thickness T. Between the end of tubular portion 30 and the region where surface 50 terminates, section 44 is formed with a peripheral surface 58 which is contained in a conical envelope to provide a smooth, uniformly sloped transition between the inner end of section 44 having the larger thickness T and its intermediate region having the thickness $t$. It is clear that after the butt weld is made, section 44 has a minimum thickness $t$ (the same thickness as pipe 38) in a radial plane passing through the juncture of surfaces 50 and 58. The slope of the line defining surface 58 in the longitudinal section of FIG. 2 is less than the slope of the intersecting line defining surface 50.

As shown in FIG. 1, section 46 is identical to section 44, with like reference numerals being applied. Also, the opposed ends of section 46 and pipe 40 are prepared for butt welding in the same maner as described for section 44 and pipe 38. The weld joining section 46 to pipe 40 is indicated at 60.

To make valve body 20, section 22 is first cast or forged by suitable, conventional methods and with the standard dimensions that it would normally have in absence of the modifications provided by this invention. This casting or forging, as shown in its preliminary, unmodified form has extended, thick tubular ends 64 (one shown in FIG. 3) which, according to conventional practice, would be machined for welding to an adjoining pipe.

In accordance with the present invention, however, ends 64 are cut away to a point such that the wall thickness of the casting or forging at the weld juncture after final machining will be at least equal to the value T as shown in FIG. 4. This may be done by rough machining to provide section 22 as shown preparatory to the application of weld metal for building up sections 44 and 46. In this embodiment, the ends of the casting or forging are machined off to provide flat annular end faces 66 (one shown in FIG. 4) which are contained in radial planes normally intersecting the longitudinal axes of passages 24 and 26 respectively.

It will be appreciated that section 22 alternatively may be cast or forged without ends 64 and thus with substantially the finished dimensions shown in FIGS. 1, 2, and 4–6. This, however, requires the use of special patterns or forging dies which are sized and dimensioned to eliminate ends 64. On the other hand, use of conventionally dimensioned patterns or forging dies, which result in the formation of ends 64, avoids the need for making special equipment.

If section 22 is cast, it preferably should conform to the ASTM Specification A-216, Grade WCB. This specification is entitled "Carbon-Steel Castings Suitable for Fusion Welding for High-Temperature Service" and covers carbon steel castings for valves, flanges, and other fittings. An example of the composition of such fittings is provided in Table I which appears in paragraph 7 of Specification A–216 and which is as follows, the proportions being by weight:

TABLE I.—CHEMICAL REQUIREMENTS

| | Grade WCB, max. percent |
|---|---|
| Carbon | 0.30 |
| Manganese | 1.00 |
| Phosphorus | 0.05 |
| Sulfur | 0.06 |
| Silicon | 0.60 |
| Residual elements: | |
| Copper | 0.50 |
| Nickel | 0.50 |
| Chromium | 0.40 |
| Molybdenum | 0.25 |
| Total content of these residual elements | 1.00 |

Forged fittings suitable for this invention preferably conform to ASTM Specification A–105, Grade II, entitled "Forged or Rolled Steel Pipe Flanges, Forged Fittings, and Valves and Parts for High Temperature Service." The chemical requirements for such forgings appear in paragraph 4 of Specification A–105 and are as follows:

TABLE I.—CHEMICAL REQUIREMENTS

| | Grade II, max. percent |
|---|---|
| Carbon | 0.35 |
| Manganese | 0.90 |
| Phosphorus | 0.05 |
| Silicon | 0.35 |
| Sulfur | 0.05 |

After the forged or cast body section 22 is formed with the dimensions shown in FIG. 4, sections 44 and 46 are formed by first fusing and building up enlarged, tubular, weld metal end sections 68 (one shown in FIG. 5) onto the tubular portions 30 and 32. Sections 68 may be applied by any suitable, conventional fusion welding process such as electric-arc welding. The metal for forming sections 68 is obtained by melting a welding rod or wire in the arc.

Preferably, each weld metal section is applied by first fusing a circular bead of weld metal to end face 66. It is understood that the end of section 22 is heated to a molten state so that it fuses with the melting welding rod or wire. The thusly formed weld metal bead is then overlaid by successively applied weld metal beads to build up section 68, with each bead being fused to the previously applied bead. The heat required to fuse the initial weld metal bead to section 22 is localized and is applied for a relatively short period. These factors, among others, preclude objectionable overheating of section 22.

To start the build up of weld metal on each end face 66, end 64 advantageously is machined to provide inner and outer annular walls 70 and 71 extending axially forwardly from the inner and outer peripheries of end face 66 to define therewith an axially opening annular recess 72. When section 22 is turned to an upstanding position, therefore, recess 72 defines an upwardly opening receptacle to receive the initial build up of weld metal. The radial dimension of end face 66 extending between walls 70 and 71 is at least equal to T.

In composite view of FIG. 6, the outline of the cast or forged end 64 is shown in dashed lines, the outline of end section 68 is shown in dotted and dashed lines, and the finally formed weld metal end section 44 is shown in solid lines. As illustrated, end sections 68 are somewhat larger than sections 44 and 46.

After sections 68 are formed, they are machined down to the finished dimensions of sections 44 and 46 as shown in FIGS. 2 and 6. During this final machining step, walls 70 and 71 are removed and the ends of sections 44 and 46 may be prepared for butt-welding in the manner previously described.

The material for forming end sections 44 and 46 preferably is made from proprietary welding rods of the low carbon, high manganese type. A typical analysis of this type of welding rod is as follows, the percentage being by weight:

| | Percent |
|---|---|
| C | 0.08–0.12 |
| Mn | 0.8–1.40 |
| Si | 0.5–0.6 |
| P and S max. | 0.20 |

FIG. 10 illustrates the conventional method of butt welding a cast or forged fitting 73 to pipe 38 where the slope of the weld, as indicated at 74 does not exceed the aforementioned 1:3 slope. As shown, the product of the section thickness T at the fitting end of weld 74 and the yield strength at the fitting end is required to be at least equal to the product of the pipe wall thickness t and the yield strength of pipe 38. FIG. 10 thus clearly illustrates the limitation which the 1:3 weld slope imposes upon the ratio of fitting thickness to pipe wall thickness. It is to be noted from FIG. 10 that weld 74 cannot extend beyond the point where the 1:3 sloped line of weld 74 intersects the prepared bevelled face 75 which, as shown, is required to be sloped at an angle of approximately 37½ degrees with a radial plane.

FIG. 7 illustrates a butt welding flange 80 constructed according to this invention and having a one-piece, cast or forged body section 82 and a weld metal end section 84. Section 82 is formed with the usual tubular, fluid flow conduit portion 86 which is fused to end section 84. Section 84 is essentially identical to sections 44 and 46, like reference numerals being applied.

As shown, section 84 forms a built-up, tubular extension of portion 86 and has a minimum wall thickness t which is equal to that of the adjoining pipe 88. The outer periphery of portion 86, which is contained in a conical envelope, has a minimum thickness T at its end face where it is fused along an annular interface to section 84. Thickness T is determined by the same equation used for determining the minimum thickness of body section 22.

The cast or forged body section 82 may be formed in the same manner as section 22. If formed with standard dimensions, the pipe connection end of portion 86 is machined off to a region where the wall thickness is at least equal to the value T as shown. Section 84 is then built-up on the prepared end of portion 86 as previously described and is thereafter machined to finished form with its pipe connection end prepared for butt welding to pipe 88. As shown, the internal diameters of sections 82 and 84 and pipe 88 are substantially equal and axially aligned.

A weld 90 joining flange 80 to pipe 88 may be provided by the usual fusion electric-arc welding process wherein the adjacent ends of section 84 and pipe 88 are heated to a molten state. The filler material forming the weld is provided by a welding rod or wire which is melted in the arc and fused with the molten metal from end section 84 and pipe 88.

In the embodiment shown in FIG. 8, the cast or forged body section, instead of being formed with the radial faces 66, is machined from the rough casting or forging of FIG. 2 to provide an annular, sloping surface 100 at each end. Surface 100, which is contained in a conical envelope, tapers uniformly towards the end of section 22 to a point where it intersects the interior cylindrical wall surface defining passage 24. In place of sections 44 and 46, built-up weld metal fitting end sections 102 (one shown) are fused to section 22 along each surface 100.

Still referring to FIG. 8, each end section 102 has a tubular configuration and peripherally and coaxially surrounds the end portion of section 22 on which surface 100 is formed. The outer peripheral surface of end section 102, as indicated at 104, is cylindrical and is contained in a conical envelope. Surface 104 slopes uniformly but more gently than surface 100. The thickness of end section 102 thus uniformly increases towards the fitting end of body 20.

In this embodiment, body section 22 is formed with an annular, radial shoulder 106 extending outwardly from surface 100. Shoulder 106 provides a support surface to facilitate the convenient build up of weld metal in forming end section 102 as will presently appear. End section 102 is fused to shoulder 106 along an interface that extends essentially radially of passage 24.

As shown, the thickness of end section 102 at shoulder 106 is preferably at least equal to the intermediate region where the weld metal forming section 102 has been diluted with the lower strength cast or forged metal as a result of fusion welding the weld metal of section 102 to body section 22.

The fitting end of section 102, which extends coaxially beyond section 22, is formed with a uniformly diametered, interior, cylindrically smooth wall surface 110. Wall surface 110 axially aligns with and has the same diameter as the passage forming wall surface of section 22 to define a smooth, uninterrupted continuation of passage 24. Surface 110 thus defines each fluid opening in body 20.

With continued reference to FIG. 8, the end face of each section 102 is prepared for butt welding to the adjacent pipe end. This butt welding preparation is the same as that described in the embodiment of FIGS. 1–6. Accordingly, like reference numerals suffixed by the letter $a$ have been applied to designate like surfaces of preparation.

As shown, surface 50a intersects surface 104 at an acute angle and preferably at a point which is spaced a short distance axially beyond the juncture of surfaces 100 and 110. Thus, the radial thickness of substantially undiluted weld metal contained in section 102 at the "fitting end" of weld 56 extends from the juncture of surfaces 50a and 104 to wall surface 110. This radial thickness of weld metal in section 102 is made equal to the wall thickness $t$ of pipe 38 as shown.

As compared with the previous embodiments, the weld end fitting construction shown in FIG. 8 reduces the amount of weld metal needed to form section 102. Furthermore, the weld end fitting of FIG. 8 advantageously has a constant strength in cross section throughout its entire length as indicated by the dimension L. This unique characteristic can be mathematically established by first determining the related thicknesses of section 102 and of the end of section 22 containing surface 100.

The thickness of high strength weld metal at any distance $x$ along the dimension L is equal to $$t - \frac{x}{L}t$$

which can be rewritten as $$t\left(L - \frac{x}{L}\right)$$

The corresponding thickness of the low strength casting or forging metal at any distance $x$ will be equal to $$\frac{x}{L}t$$

where T is the thickness of section 22 extending radially from the juncture of surface 104 with shoulder 106 to the internal wall surface defining passage 24.

The strength of the composite cross section of sections 22 and 102 along the dimension L will therefore be equal to $$tS_1\left(L - \frac{x}{L}\right) + TS_2\frac{x}{L}$$

where $S_1$ is the yield strength of the weld metal end section 102 and where $S_2$ is the yield strength of the cast or forged body section 22. Since $tS_1$ is equal to $TS_2$ as previously mentioned in connection with the embodiment of FIGS. 1–6, the foregoing equation for the composite cross section of sections 22 and 102 can be rewritten as $$tS_1\left[\left(1-\frac{x}{L}\right)+\frac{x}{L}\right]$$

It is apparent that this last equation is equal to $tS_1$, a constant.

To make the weld end fitting of FIG. 8, the rough casting or fitting is formed with or machined to the configuration and dimensions shown in full lines in FIG. 9a. Each section 102 is thereafter formed by first fusing and building up an enlarged, annular section 116 as outlined in dashed lines in FIG. 9. The method and weld metal used to form each section 116 is the same as that described for sections 68 in the embodiment of FIGS. 1–6.

Preferably, each section 116 is applied by first fusing a circular bead onto shoulder 106 in peripherally surrounding relation to surface 100 and then successively overlaying further beads one upon the other until section 116 is completely built up. Finally, the enlarged section 116 is machined to provide the dimensions and configuration of section 102. Advantageously, each cast or forged tubular end 64 is machined to provide an annular, axially extending lip 117. Lip 117 provides a support for the forward portion of weld metal that is applied axially beyond surface 100. As shown, lip 117 is cut away when passage 24 is bored to its finished dimension.

It will be appreciated that the fitting end construction of FIG. 8 may be used to make the flange shown in FIG. 7, as well as the valve body shown in FIG. 1.

In the embodiment shown in FIG. 11, each end of the rough casting or forging of FIG. 2 is undercut to provide a tapered, annular end portion 130. End portion 130 is formed with a uniformly sloping, cylindrically smooth, internal annular wall surface 132 which is contained in a conical envelope and which terminates at its outer end at a point of intersection with an external surface 134. Surface 134 defines the outer periphery of end portion 130 and slopes in the opposite direction relative to surface 132. End portion 130 is thus formed with a triangular or wedge-shaped cross section which has a decreasing thickness in a direction extending axially towards the butt-welding end of the fitting.

With continuing reference to FIG. 11, the inner end of surface 132 terminates at an internal annular shoulder 136. Shoulder 136 is formed in section 22 and extends radially outwardly from the internal peripheral wall surface defining passage 24.

In place of the previously described weld metal end sections, the embodiment of FIG. 11 is provided at each end with a built-up weld metal fitting end section 140 (one shown) which is fused to end portion 130 along surface 132. End section 140 has an annular configuration and, in contrast to the embodiment of FIG. 8, is peripherally and coaxially surrounded by end portion 130.

Still referring to FIG. 11, end section 140 is formed with a uniformly diametered, cylindrically smooth, internal wall surface 142 in axial alignment with passage 24. The internal diameter of section 140 defined by surface 142 is equal to the diameter of passage 24 axially inwardly of shoulder 136. Section 140 thus provides a uniformly diametered continuation of passage 24 and defines the fluid opening in body 20. Section 140 is also fused to shoulder 136 along an interface that extends essentially radially of passage 24.

Along the conical interface where section 140 is fused to end portion 130 at surface 132, end section 140 is provided with a uniformly increasing radial wall thickness in a direction extending towards the butt welding end of the fitting. The thicknesses of end portion 130 and section 140 thus vary inversely along this conical interface.

Still referring to FIG. 11, the end face of section 140 is prepared for butt welding to the adjacent pipe end in the same manner as described in embodiment of FIGS. 1–6. Accordingly, like reference numerals suffixed by the letter b have been applied to designate the corresponding surfaces of preparation in the embodiment of FIG. 11.

End section 140, as shown in FIG. 11, extends axially beyond end portion 130 and has an exposed, external peripheral surface 144 which conveniently is contained in the conical envelope containing surface 134. Surfaces 134 and 144 are thus formed with the same slope.

Surface 144 extends from the apex defined by the intersection of surfaces 132 and 134 and terminates at a point of intersection with surface 50b. The radial thickness of end section 140 at this point of intersection between surfaces 50b and 144 is made at least equal to the wall thickness of pipe 38 as shown. The radial thickness of section 22 along a plane containing shoulder 136 is made at least equal to the previously mentioned value T.

Similar to the embodiment of FIG. 8, the fitting construction shown in FIG. 11, as compared with the fittings illustrated in FIGS. 1–7, reduces the amount of weld metal needed to form section 140. The cross sectional strength of the fitting shown in FIG. 11 is also constant along the conical interface where section 140 is fused to end portion portion 130. A mathematical analysis similar to that described in connection with the fitting of FIG. 8 can be developed to show that the combined thicknesses of section 140 and end portion 130 provide a constant strength along the conical interface at surface 132.

To make the weld end fitting illustrated in FIG. 11, the rough casting or forging of FIG. 2 is formed with or machined to the configuration and dimensions shown in full lines in FIG. 12. Each end section 140 is thereafter formed by first fusing an enlarged, annular section 150 as outlined in dashed lines in FIG. 13. The weld metal used to form each section 150 is the same as that described for sections 68 of FIGS. 5 and 6.

With the pre-weld configuration of FIG. 12 the application of the weld metal is facilitated by the position of the weld groove in the inward facing surface of a cylindrical wall. This makes it especially convenient to use an automatic welding process involving an electric arc submerged in a powder or granular flux. If the work piece is rotated during the weld, the weld application can always be at the lowest point on the circular groove, and the loose particulate flux will tend to remain in the vicinity of the weld by falling towards it as motion of the piece would otherwise carry it away. Finally, section 115 is machined to provide the dimensions and configuration of section 140.

It is evident from the foregoing that the fitting end construction of FIG. 11 may be used to make the flange shown in FIG. 7, as well as the valve body shown in FIG. 1.

The invention may be embodied in other specific forms without departing from the spirit or essential characteristics thereof.

What is claimed and desired to be secured by Letters Patent is:

1. A fitting having fluid inlet and outlet openings and adapted to be butt welded to a fluid flow conduit structure having a predetermined yield strength and a predetermined wall thickness, said fitting comprising a first body section defining a fluid flow passage between said openings and being formed from a material having a yield strength that is less than said predetermined yield strength of said structure, and at least a second body section fused to said first section to provide an axial continuation thereof and defining one of said openings, said second section having an outer end prepared to define a portion of a groove for receiving weld metal in the form of a butt weld for joining the fused composite of said first and second sections to said structure, the wall thickness of the region of said first section extending axially beyond said second section being greater than said predetermined wall thickness of said structure thereby to compensate for the difference between the yield strengths of said first section and said structure, said second section being formed from a material which is dissimilar as compared with that of said first section and which has a yield strength that is sufficiently greater than that of said first section so that the region of said second section axially adjacent to said butt weld and extending between said butt weld and said first section is formed with a wall thickness that is comparable to that of said structure and less than that of said first section in the region extending axially beyond said second section.

2. The fitting defined in claim 1 wherein said second section is formed from weld metal.

3. The fitting defined in claim 2 wherein said first section is a casting.

4. The fitting defined in claim 2 wherein said first section is a forging.

5. The fitting defined in claim 1 wherein said first and second sections define a valve body.

6. The fitting defined in claim 1 wherein said first and second sections define a pipe flange.

7. A fitting having fluid inlet and outlet openings and comprising a first body section defining a fluid flow passage between said openings, and at least a second body section defining one of said openings and having an end prepared for butt welding to a fluid flow conduit structure, said first and second body sections being fused together and being separately formed from dissimilar materials, with said second section having a greater yield strength than that of said first section, and being formed from weld metal, said first section being joined to an adjacent end of said second section along an interface extending transversely of said flow passage, the wall thickness of said first section at the region where said second section terminates being greater than that of said second section adjacent to the fitting end where it is adapted to be joined to said conduit structure by a butt weld, the product of the first section wall thickness at the adjacent region where said second section terminates and the yield strength of said first section being at least equal to the product of the yield strength of said second section and the second section wall thickness at the fitting end of said butt weld.

8. The fitting defined in claim 7 wherein the yield strength of said second section at least approaches that of said conduit structure.

9. The fitting defined in claim 7 wherein said sections are axially aligned, with said second section providing a built-up extension of said first section, and wherein the end of said second section that is prepared for butt welding has a bevelled external periphery which is adapted to define with the prepared end of said conduit structure an annular butt welding groove of V-shaped cross-section.

10. A method of making a fitting having fluid inlet and outlet openings for butt welding to a fluid flow conduit structure having a predetermined yield strength and a predetermined wall thickness, said method comprising the steps of forming a first body section (a) with a fluid passage, (b) from a material which is dissimilar as compared with that of said structure and which has a yield strength that is less than said predetermined yield strength of said structure, and (c) with a wall thickness that is greater than said predetermined wall thickness of said structure to compensate for the difference between yield strengths of said first body section and said structure, fusing at least a second body section to said first body section to define an axial continuation of said passage and one of said openings, preparing the outer end of said second section to define a portion of a groove for receiving weld metal in the form of a butt weld for joining the composite of said first and second sections to said structure, and forming said second section from a material which is dissimilar as compared with that of said first section and which has a yield strength that is sufficiently greater than that of said first section to enable the region of said second section axially adjacent said butt weld and extending between said butt weld and said first section to be formed with a wall thickness that is less than the wall thickness of said first section and is comparable to said predetermined wall thickness of said structure.

11. The method defined in claim 10 wherein said second section is formed by building up layers of weld metal.

12. The method defined in claim 11 comprising the step of providing said second section with an annular cross section and with a decreasing wall thickness extending from said first body section towards its outer end.

13. The method defined in claim 12 comprising the steps of providing said sections with at least approximately equal wall thicknesses at the interface where they are fused together and providing the outer end of said second section with a thickness at least approximately equal to the fluid conduit structure to which it is adapted to be butt welded.

14. The method defined in claim 11 wherein said body section is formed by casting.

15. The method defined in claim 11 wherein said first body section is formed by forging.

16. In combination with a fluid flow conduit, a fitting comprising a body section defining a fluid flow passage and a weld metal section fused to said body section and forming a continuation of said passage, said weld metal section and said structure having opposing end surfaces defining an annular weld metal-receiving groove, an annular butt weld in said groove said fusing said weld metal section to said conduit, and said body section being formed from a different material than said weld metal section and said conduit and having a yield strength which is less than that of said weld metal section and said conduit.

17. A fitting having fluid inlet and outlet openings and adapted to be butt welded to a fluid flow conduit structure, said fitting comprising first and second body sections separately formed from dissimilar materials and being fused together to define a composite fitting body, with said first section defining a fluid flow passage between said openings, and said second section defining one of said openings, said second section having a yield strength greater than that of said first section and having an outer end prepared to be joined to said structure by a transition butt weld, said first and second sections being fused together at least mainly along an annular ond section.

18. The fitting defined in claim 17 wherein the thick-interface that diverges toward said outer end of said sec-nesses of said first and second sections vary inversely along said interface.

19. The fitting defined in claim 17 wherein said second section is formed with a uniformly increasing thickness along said interface in a direction extending towards its butt welding end, and wherein a portion of said first section peripherally surrounds said second section and is formed with a uniformly decreasing thickness along said interface and in the direction of increasing thickness of said second section.

20. The fitting defined in claim 17 wherein the portion of said second section extending along said interface is of annular configuration and is peripherally surrounded by a mating, annular end portion of said first section.

21. The fitting defined in claim 20 wherein said second section is formed from weld metal.

References Cited

UNITED STATES PATENTS

| | | | |
|---|---|---|---|
| 2,555,256 | 5/1951 | Tyson | 285—286 |
| 2,763,923 | 9/1956 | Webb | 285—286 X |
| 2,787,699 | 4/1957 | Jessen | 285—286 X |
| 3,188,116 | 6/1965 | Christensen | 285—286 X |
| 3,392,994 | 7/1968 | Moore | 285—286 |
| 2,374,763 | 5/1945 | Martin | 285—286 |
| 918,926 | 4/1909 | Tanner | 285—286 |
| 1,613,461 | 1/1927 | Johnson | 285—286 X |
| 1,939,242 | 12/1933 | Thoheld | 285—286 X |
| 2,154,407 | 4/1939 | Miller | 285—286 X |
| 2,206,166 | 7/1940 | Dunn | 285—286 X |
| 2,257,335 | 9/1941 | Evans et al. | 285—286 |
| 2,289,271 | 7/1942 | Kane et al. | 285—172 X |
| 2,769,318 | 11/1956 | Grenell | 285—329 X |

FOREIGN PATENTS

| | | |
|---|---|---|
| 555,495 | 1/1957 | Italy. |
| 1,179,772 | 10/1964 | Germany. |

REINALDO P. MACHADO, Primary Examiner

D. W. AROLA, Assistant Examiner

U.S. Cl. X.R.

29—481; 285—286

UNITED STATES PATENT OFFICE
CERTIFICATE OF CORRECTION

Patent No. 3,514,130                                    May 26, 1970

Bertram J. Milleville

It is certified that error appears in the above identified patent and that said Letters Patent are hereby corrected as shown below:

Column 1, line 21, "defied" should read -- defined --. Column 3, line 46, "thickness" should read -- thicknesses --. Column 10, line 4, after "thereby" cancel "to". Column 11, line 35, "said", second occurrence, should read -- and --. Column 12, line 1, after "annular" insert -- interface that diverges towards said outer end of said sec- --; same column 12, cancel line 4.

Signed and sealed this 13th day of October 1970.

(SEAL)
Attest:

Edward M. Fletcher, Jr.                              WILLIAM E. SCHUYLER, JR.
Attesting Officer                                            Commissioner of Patents